(12) United States Patent
Zhu et al.

(10) Patent No.: US 7,644,162 B1
(45) Date of Patent: Jan. 5, 2010

(54) RESOURCE ENTITLEMENT CONTROL SYSTEM

(75) Inventors: Xiaoyun Zhu, San Jose, CA (US); Xue Liu, Champaign, IL (US); Sharad Singhal, Belmont, CA (US); Martin Arlitt, Alberta (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 819 days.

(21) Appl. No.: 11/147,052

(22) Filed: Jun. 7, 2005

(51) Int. Cl.
*G06F 15/173* (2006.01)

(52) U.S. Cl. .................................................. 709/226
(58) Field of Classification Search ................ 709/204, 709/220–228, 201, 209; 370/270, 465, 477, 370/351–358; 310/26–28
See application file for complete search history.

(56) References Cited

U.S. PATENT DOCUMENTS

| | | | |
|---|---|---|---|
| 6,404,581 B1* | 6/2002 | Shah | 360/75 |
| 6,574,587 B2* | 6/2003 | Waclawski | 702/186 |
| 6,788,692 B1* | 9/2004 | Boudreau et al. | 370/400 |
| 7,406,691 B2* | 7/2008 | Fellenstein et al. | 718/104 |
| 2004/0111509 A1* | 6/2004 | Eilam et al. | 709/224 |
| 2005/0268063 A1* | 12/2005 | Diao et al. | 711/170 |

OTHER PUBLICATIONS

Abdelzaher, T.F. et al., "Performance Guarantees for Web Server End-Systems: A Control-Theoretical Approach", IEEE Transactions on Parallel and Distributed Systems, Jan. 2002.
Banga, G. et al., "Resource Containers: A New Facility for Resource Management in Server Systems", 3rd Symposium on Operating Systems Design and Implementation, Feb. 1999.
Barham, P. et al., "Xen and the Art of Virtualization", SOSP, Oct. 2003.
Bhoj, P. et al., "Web2K: Bringing QoS to Web Servers", HP Labs Technical Report, HPL-2000-61, May 2000.
Diao, Y. et al., "Managing Web Server Performance with AutoTune Agents", IBM Systems Journal, vol. 42, No. 1, 2003.
Diao, Y. et al., "Using Fuzzy Control to Maximize Profits in Service Level Management", IBM Systems Journal, Vo. 41 No. 3, 2002.
Gandhi, N. et al., "MIMO Control of an Apache Web Server: Modeling and Controller Design", downloaded Jun. 6, 2005.

(Continued)

*Primary Examiner*—Nathan Flynn
*Assistant Examiner*—Mark O Afolabi (57) ABSTRACT

A resource entitlement control system includes a controller, a model estimator, and a controller designer. The controller is operable to control an allocation of resources to a resource container. The model estimator is operable to calculate model parameters based on performance metrics and past resource allocations to the resource container, and the controller designer is operable to calculate one or more controller parameters based on the model parameters. The controller is also operable to calculate a control variable for controlling the allocation of resources to the resource container based on the controller parameters and the performance metrics.

19 Claims, 5 Drawing Sheets

OTHER PUBLICATIONS

Jones, M. B. et al., "CPU Reservations and Time Constraints: Efficient, Predictable Scheduling of Independent Activities", 16th Annual Symp. on Syst. Princ. Oct. 1997.

Kamra, A. et al., "Yaksha: A Self-Tuning Controller for Managing the Performance of 3-Tiered Web Sites", downloaded Jun. 6, 2005.

Kandasamy, N. et al., "Self-Optimization in Computer Systems via Online Control: Application to Power Management", downloaded Jun. 6, 2005.

Karlsson, M. et al., "Triage: Performance Isolation and Differentiation for Storage Systems", downloaded Jun. 6, 2005.

Liu, X. et al., "Adaptive Entitlement Control of Resource Containers on Shared Servers", HP Technical Report, HPL-2004-178, Internal Accession Date Oct. 2004.

Lu, C. et al., "A Feedback Control Approach for Guaranteeing Relative Delays in Web Servers", IEEE (RTAS'01), Jun. 2001.

Lu, C. et al., "End-to-End Utilization Control in Distributed Real-Time Systems", downloaded Jun. 6, 2005.

Lu, Y. et al., "An Adaptive Control Framework for QoS Guarantees and its Application to Differentiated Caching Services", downloaded Jun. 6, 2005.

Lu, Y. et al., "Differentiated Caching Services; A Control-Theoretical Approach", downloaded Jun. 6, 2005.

Marti, P. et al., "On Real-Time Control Tasks Schedulability", downloaded Jun. 6, 2005.

Mercer, C.W. et al., "Processor Capacity Reserves: Operating System Support for Multimedia Applications", downloaded Jun. 6, 2005.

Mosberger, D. et al., "Httperf—A Tool for Measuring Web Server Performance", downloaded Jun. 6, 2005.

Parekh, S. et al., "Feedback Control of Lotus Notes Server: Modeling and Control Design", IBM Research Report, Feb. 2001.

Rajkumar, R. et al., "Resource Kernels: A Resource-Centric Approach to Real-Time and Multimedia Systems", downloaded Jun. 6, 2005.

Rolia, J. et al., "Statistical Service Assurances for Applications in Utility Grid Environments", HP Technical Report, HPL-2002-155, Internal Accession Date Jun. 2002.

Subramanian, I. et al., "Meeting Performance Goals with the HP-UX Workload Manager", downloaded Jun. 6, 2005.

http://www.apache.org/, The Apache Web Server, downloaded Jun. 6, 2005.

http://www.aurema.com/, Aurema ARMTech, downloaded Jun. 6, 2005.

http://www.hp.com/products1/unix/operating/prm/, HP Process Resource Manager, downloaded Jun. 6, 2005.

http://www.hp.com/products1/unix/operating/wlm/index.html, HP-UX Workload Manager, downloaded Jun. 6, 2005.

http://h71028.www7.hp.com/enterprise/cache/10381-0-0-0-121.aspx, HP Virtual Server Environment, downloaded Jun. 6, 2005.

http://www-1.ibm.com/servers/eserver/xseries/systems_management/director_4/awm.html, IBM Application Workload Manager, downloaded Jun. 6, 2005.

http://www-1.ibm.com/servers/eserver/zseries/zos/wlm/, IBM Workload Manager, downloaded Jun. 6, 2005.

http://www.mathworks.com/products/sysid/, MathWorks System Identification Toolbox, downloaded Jun. 6, 2005.

http://www.microsoft.com/windowsserversystem/virtualserver/default.mspx, Microsoft Virtual Server, downloaded Jun. 6, 2005.

http://www.sun.com/software/resourcemgr/index.html, Sun Solaris Resource Manager, downloaded Jun. 6, 2005.

http://vvww.vmware.com, VMware, downloaded Jun. 6, 2005.

Astrom, K. J. et al., "Adaptive Control" (2nd Edition), Prentice Hall, 1994, p. 90-92.

Franklin, G.F. et al., "Digital Control of Dynamic Systems" (3rd Edition), Prentice Hall, 1997, p. 66, 503-510.

Ljung, L., "System Identification: Theory for the User", (2nd Edition), Prentice Hall, 1999, p. 71-73.

* cited by examiner

RESOURCE ENTITLEMENT CONTROL SYSTEM

BACKGROUND

In many of today's data centers, servers are shared across multiple applications. However, current tools for allocating servers or server partitions to applications typically rely on offline capacity planning and performing a static partitioning of system resources to support these co-hosted applications. For example, each application is allocated a maximum entitlement of system resources for execution. Many times, the amount of the maximum entitlement of system resources is either based on anticipated peak load or demand profiles computed from historic data. However, the entitlement of system resources is static. For example, the entitlement of system resources is determined and used for a long period of time before being re-evaluated. This static entitlement typically results in low utilization of system resources and does not take full advantage of demands that vary over time due to changes in operating conditions and user demands.

SUMMARY

A resource entitlement control system includes a controller, a model estimator, and a controller designer. The controller is operable to control an allocation of resources to a resource container. The model estimator is operable to calculate one or more model parameters based on performance metrics for the resource container, and the controller designer is operable to calculate one or more controller parameters based on the model parameters. The controller is also operable to calculate a control variable for controlling the allocation of resources to the resource container based on the controller parameters and the performance metrics.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
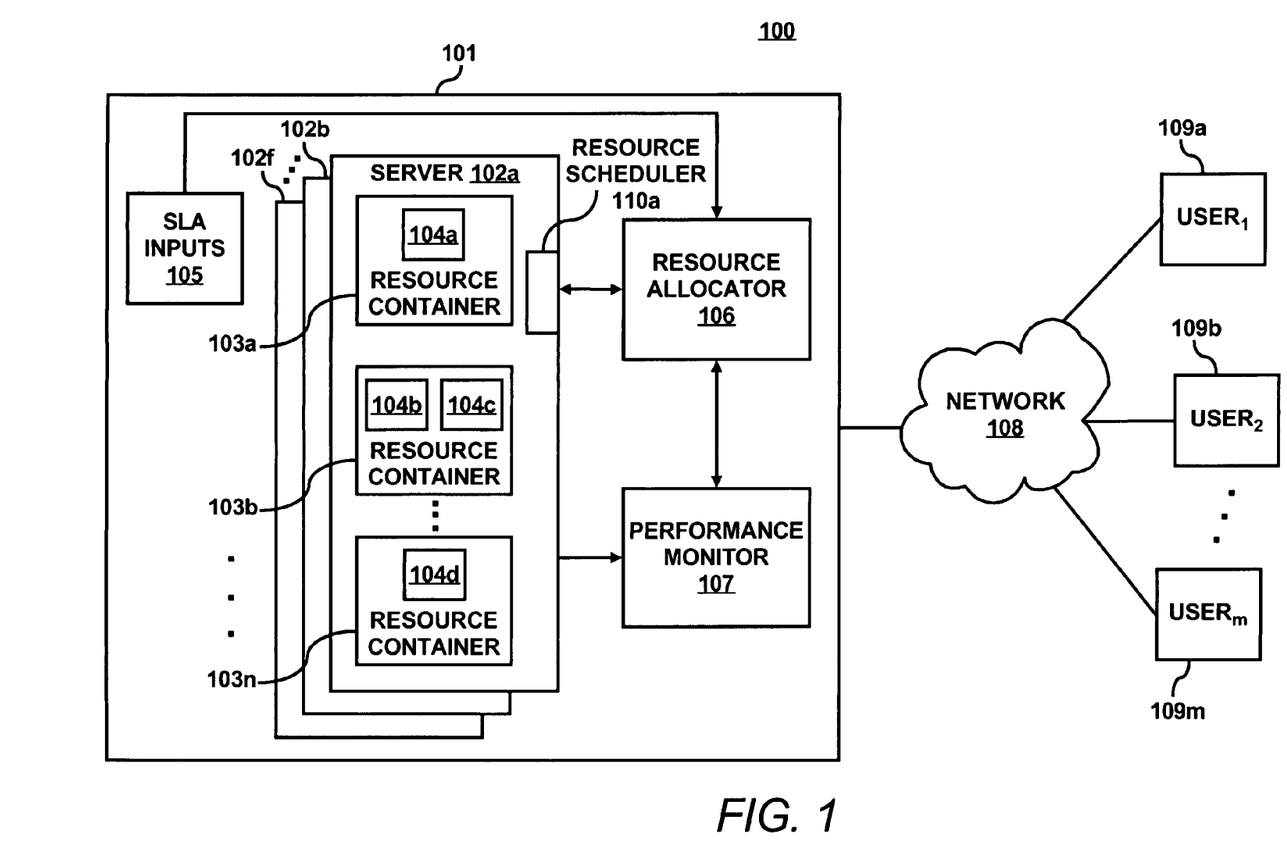
FIG. 1 is a system block diagram of a system according to an embodiment.

With reference first to FIG. 1, there is shown a system 100, according to an embodiment. The system 100 is operable to provide resources on demand. It will be apparent to one of ordinary skill in the art that one or more of the embodiments described herein may be practiced in different types of resource on demand environments, such as a data center where servers or portions of servers are allocated, a grid environment, and other types of resource-on-demand environments.

As shown, the system 100 includes a data center 101 connected to a network 108. One or more client devices 109$a$ ... $m$, such as a Personal Computer (PC), Personal Digital Assistant (PDA), wireless terminal, cellular telephone, or another type of well known client device is connected to the data center 101 via the network 108. The client device may also include servers which may be in different data centers. The network 108 may be a private network such as an intranet, and/or a public network such as, for example, the Internet.

The data center 101 includes servers 102$a$ ... $f$, a resource allocator 106, a performance monitor 107, and SLA inputs 105. The servers 102$a$ ... $f$ are partitioned into resource containers. Resource containers 103$a$ ... $n$ are shown as an example of partitioning the server 102$a$. Each resource container 103$a$ ... $n$ includes resources allocated for one or more applications. Examples of resources include one or more CPUs, memory, I/O bandwidth, disk space, and other known server resources.

In one embodiment, a resource container is represented as a process group including one or more applications. The resource container 103$a$, for example, is a process group including application 104$a$. A process group may include multiple applications such as shown for the resource container 103$b$. In this embodiment, the resources of the server 102$a$ are partitioned for each process group. For example, the CPUs in the server 102$a$ are divided among the resource containers 103$a$ ... $n$, whereby each resource container includes a process group.

In another embodiment, the servers 102$a$ ... $f$ are partitioned into virtual machines. For example, each resource container includes a virtual machine wherein a set of resources are allocated to each virtual machine. In yet another embodiment, the servers 102$a$ ... $f$ may include a plurality of server groups that are allocated to one or more applications.

Each of the servers 102$a$ ... $f$ may also include a resource scheduler that allocates resources among the resource containers based on instructions from the resource allocator 106. In one embodiment, a resource scheduler is the scheduler in Hewlett-Packard's HP-UX Process Resource Manager (PRM). The PRM is a resource management tool that controls how resources are allocated.

A resource scheduler 110$a$ is shown for the server 102$a$. Although not shown, one or more resource schedulers may be provided for each server or a single resource scheduler may be used for multiple servers.

The SLA inputs 105 includes one or more performance parameters that specify a level of service to be provided by a particular application. For example, SLA inputs 105 may include a parameter that specifies a maximum response time, a minimum communications bandwidth, or a minimum local memory size to be allocated to an application.

The resource allocator 106 determines the allocation of resources for a resource container. For example, the resource allocator 106 identifies performance parameters from the SLA inputs 105 and allocates the resources of the server 102$a$ to each resource container 103$a$ ... $n$ based on one or more performance metrics measured by the performance monitor 107, and one or more performance parameters to be met for each application.

The performance monitor 107 provides performance monitoring information to the resource allocator 106 associated with the demand on the resources of the server 102a. For example, the performance monitor 107 monitors performance metrics for each resource container 103a . . . n and provides the metrics to the resource allocator 106. The metrics may be related to the performance parameters specified in the SLA inputs 105. Examples of the performance metrics include response time, throughput, CPU utilization, memory utilization, I/O bandwidth utilization, disk space utilization, and others. The resource allocator 106 adjusts the resources allocated for each resource container 103a . . . n in response to the measured performance metrics and the corresponding SLA input(s) 105.

In one example, the resource container 103a includes application 104a for a server providing an e-commerce site that offers products for purchase online. An SLA input for the server includes a maximum response time of 5 seconds. For example, user 1 using the client device 109a should not wait longer than 5 seconds to receive a requested web page from the e-commerce site. If the demand on the server is high, the resource allocator 106 may allocate resources from the other resource containers 103b or 103c to satisfy the performance parameter of a maximum response time of 5 seconds for the server.

FIG. 1 shows one resource allocator and one performance monitor by way of example. It will be apparent to one of ordinary skill in the art that more than one resource allocator and performance monitor may be used.

Figure 2:
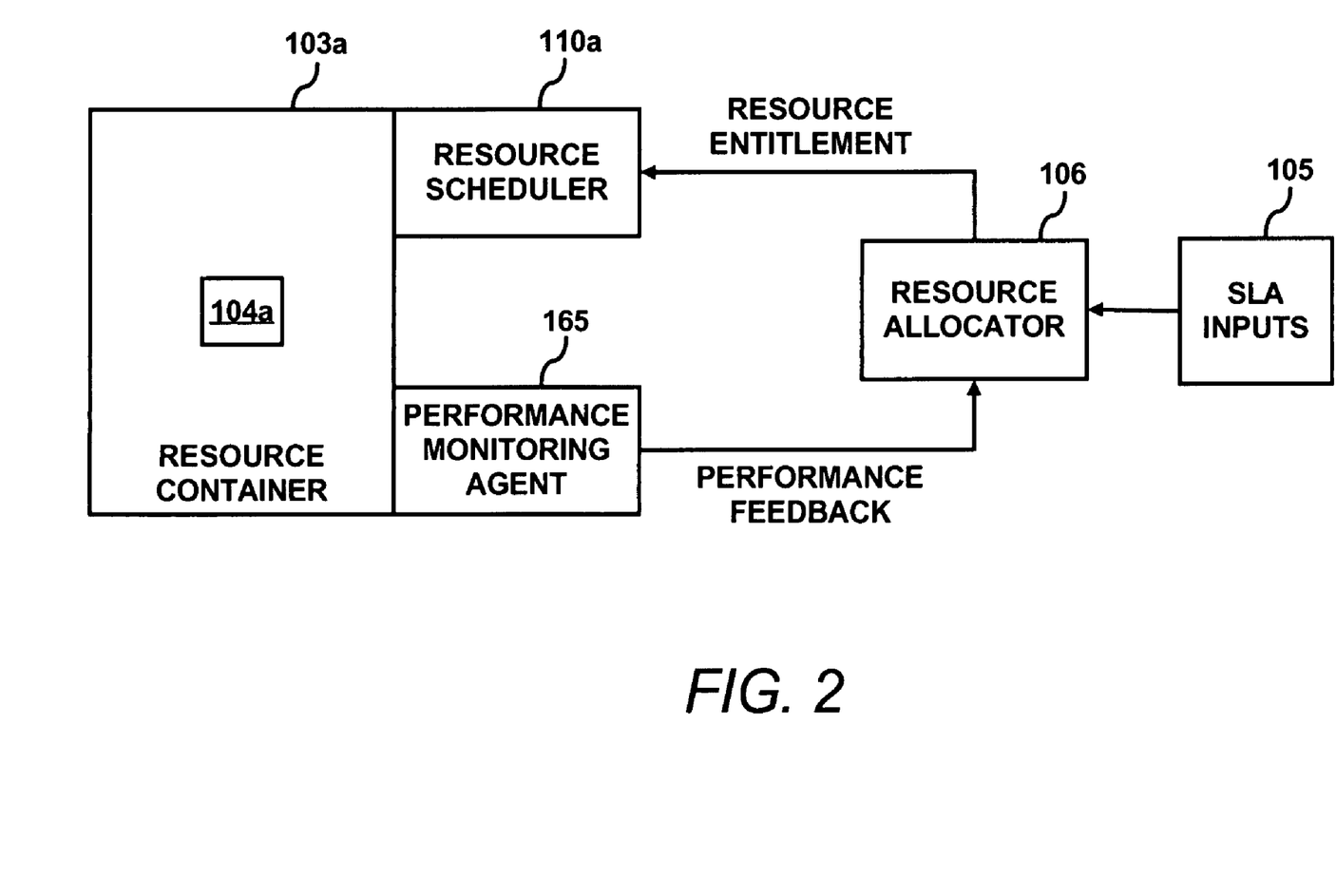
FIG. 2 is a detailed functional block diagram of the system, according to an embodiment.

With respect to FIG. 2, there is shown an embodiment of a resource container which may be included in a server of the servers 102a . . . f shown in FIG. 1. FIG. 2 illustrates the resource container 103a including application 104a. In this embodiment, the resource container 103a is a process group including the application 104a. However, the resource container 103a may include other types of server partitions. Also, in FIGS. 2 and 3, a single resource container is shown by way of example, and the systems shown in those figures may include multiple resource containers.

The resource scheduler 110a and a performance monitoring agent 165 may be respectively used to allocate resources for the resource container 103a and to determine the performance monitoring information for the resource container 103a. The performance monitoring agent 165, for example, is part of the performance monitor 107 shown in FIG. 1. In one example, the performance monitoring agent 165 measures the performance metrics for the application performance in the resource container 103a. Measuring or determining the performance metrics includes measuring the performance of the application 104a in the resource container 103a according to the performance metrics which may be specified in the SLA. The performance monitoring agent 165 sends the performance monitoring information, including the measured metrics, to the resource allocator 106. The measured metrics may be used as performance feedback of the application 104a and/or feedback on resource usage in the resource container 103a. In another example, the performance monitor determines a statistical metric from one or more measured performance metrics, such as an average or a moving average for one or more measured attributes. The statistical metric is also a performance metric.

The resource allocator 106 determines the allocation of resources for the resource container 103a using the performance monitoring information and the SLA inputs 105 for the applications 104a. Determining the allocation of resources is described in further detail with respect to FIGS. 3 and 4.

The resource allocator 106 sends resource entitlement instructions to the resource scheduler 110a for adjusting the allocation of resources in the resource container 103a. For example, the server 102a may include one or more resource schedulers, one for each resource type, such as the resource scheduler 110a. The resource allocator 106 sends resource entitlement instructions to the resource scheduler 110a and the resource scheduler 110a allocates resources to the resource container 103a and possibly other resource containers in the server 102a accordingly. A control variable calculated by the resource allocator 106 is an example of an instruction.

Figure 3:
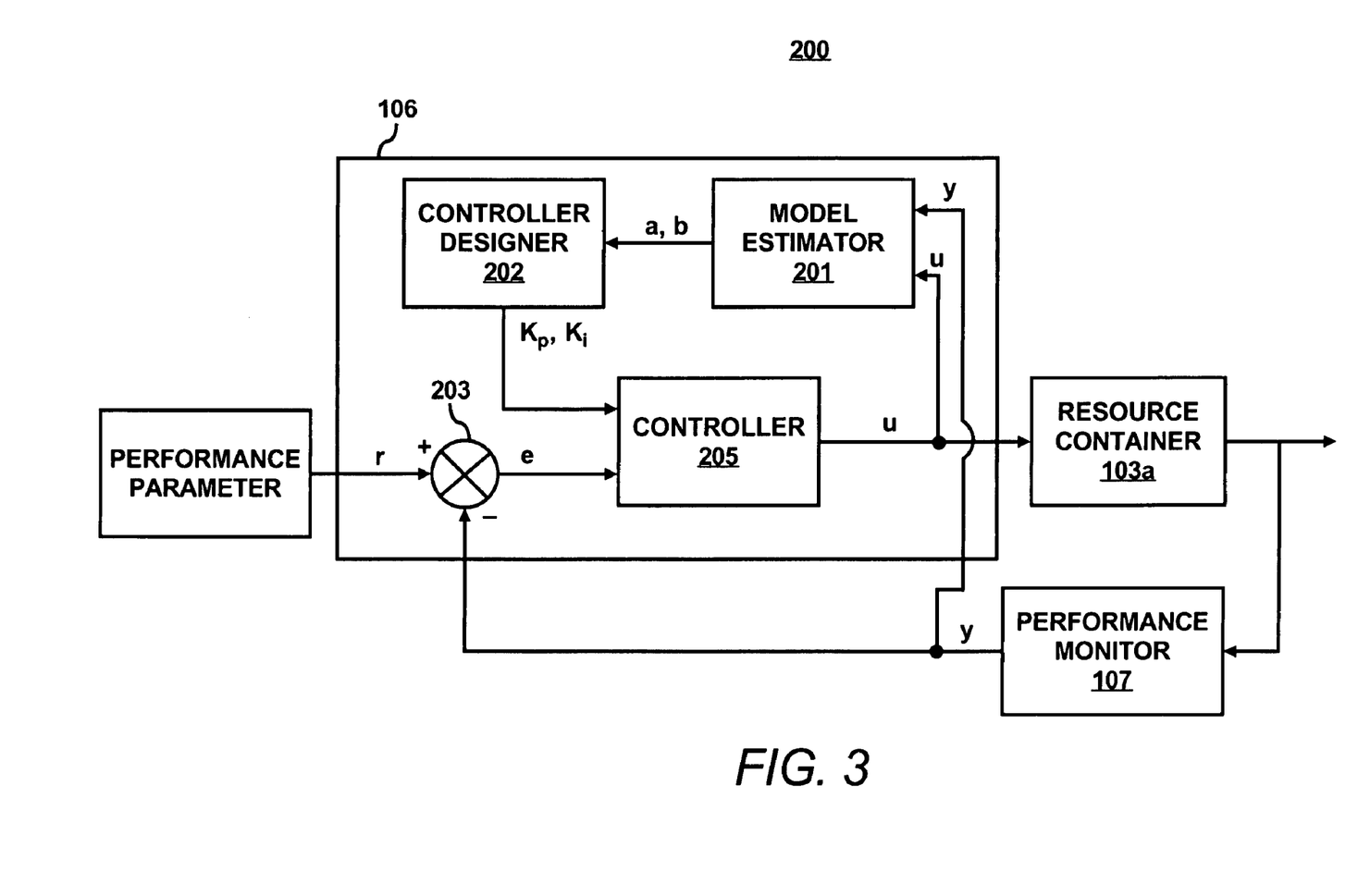
FIG. 3 is a block diagram of a resource entitlement control system according to an embodiment.

With reference to FIG. 3, there is shown a resource entitlement control system providing adaptive feedback control for allocating resources. The control system 200 includes the resource allocator 106, the resource container 103a and the performance monitor 107. In particular, the control system 200 may be a self-tuning regulator having a feedback control loop. The resource allocator 106, for example, includes a controller 205, a model estimator 201, and a controller designer 202. The feedback control loop in the control system 200 includes the performance monitor 107 providing feedback, such as the performance monitoring information, to the controller 205 via feedback node 203. The self-tuning portion of the control system 200 includes the model estimator 201, the controller designer 202, and the controller 205. The self-tuning portion provides adaptive control of the feedback loop.

Regarding the feedback loop, the performance monitor 107 measures the performance metrics of the application 104a, which is shown in FIG. 1, inside the resource container 103a to determine the performance monitoring information for the resource container 103a. The performance monitoring information may include a performance metric that indirectly reflects the demand on the resources allocated to the resource container 103a. For example, the performance monitor 107 may calculate the mean response time (MRT) for the application 104a in the resource container 103a to service requests. For example, if the MRT is increasing in successive intervals, then the demand is increasing.

An example of a performance metric is shown in FIG. 3 as "y". The performance metric "y" may be represented as the performance metric "y(k)", where "k" is an index for a sampling interval. For example, the performance monitor 107 may calculate "y(k)" for each of a plurality of metrics measured for the resource container 103a during sampling intervals. The value of "y(k)" may be an average, such as the MRT, or a moving average. For example, as an average, "y(k)" may be calculated as the sum of the all the sample values for a particular metric measured at the last interval k−1. As another example, as a moving average, "y(k)" may be calculated as the sum of the five MRT's calculated for the last five intervals k−5, k−4, k−3, k−2, and k−1. The sum is divided by the number of intervals, which is five in this example. Thus, as the performance metric changes, the values for "y(k)" change.

The performance monitor 107 may output "y" to a feedback node 203 and to the model estimator 201. At the feedback node 203, "y" is compared to a reference value "r" to determine an error "e". In one example, $$e(k)=r(k)-y(k) \qquad \text{Eq. (1)}$$

The reference value "r", for example, is a performance parameter from the SLA inputs 105 shown in FIG. 1. An example of "r" is a maximum MRT. The reference value "r"

may include values other than those specified in the SLA inputs 105. The reference value "r" may be static or may change.

Similarly to the performance metric "y", the error "e" and the reference "r" may be determined for each interval "k", where "k", for example, is an interval during which a metric was measured. In this example, the error "e" is the difference between "r" and "y", and "k" is the index for the sampling interval.

The controller 205 determines a control variable "u" for controlling the allocation of resources for the resource container 103a over time. Similarly to "y" and "e", the control variable "u" may be determined for each interval, such as "u(k)". An example of the control variable "u" is a CPU entitlement percentage. For example, if the demand of the application 104a in the resource container 103a increases, the resource allocator 106 may increase the CPU entitlement percentage allocated to the resource container 103a to satisfy the reference value "r". As the demand of the applications in the resource container 103a decreases, the resource allocator 106 may decrease the CPU entitlement percentage allocated to the resource container 103a. For example, the resource allocator 106 adjusts the control variable u(k) to decrease the CPU entitlement percentage of the resource container 103a from 20% to 15%, thereby freeing up 5% of CPU time for other resource containers. This results in more efficient allocation of server resources than would otherwise be realized.

According to an embodiment, the control variable "u" is determined using the error "e" and the controller parameters Kp and Ki received from the controller designer 202. The controller parameters Kp and Ki are specific to a proportional and integral controller and other parameters may be used with other types of controllers. The controller parameters are determined using the self tuning regulation portion of the control system 200 including the model estimator 201 and the controller designer 202, which is described in further detail below.

According to an embodiment, the controller 205 is a proportional and integral controller. The control variable "u" is determined using the error "e" and the controller parameters (Kp, Ki) received from the controller designer 202. The controller parameters (Kp, Ki) are determined using the self tuning regulation portion of the control system 200 including the model estimator 201 and the controller designer 202, which is described in further detail below.

The controller 205 may determine the control variable "u(k)" based on the following equation:

$$u(k)=Kp*e(k)+Ki*(e(0)+\ldots+e(k)) \quad \text{Eq. (2)}$$

In this embodiment, where the controller 205 is a proportional and integral controller, the controller 205 consists of two parts: the proportional part and the integral part. The controller parameters (Kp, Ki) are for adjusting the proportional part and the integral part of the controller 205 respectively. Kp is the gain for the proportional part of the controller 205, which is proportional to the error "e". As the gain Kp is increased, the control system 200 responds faster to changes in demand. In certain situations large values in the gain Kp may result in the control system 200 becoming under damped and eventually unstable. In addition, when used alone, proportional control may not guarantee that the error "e" converges to zero eventually. In other embodiments, the controller 205 may be a proportional controller or other type of controller.

Ki, for the proportional and integral controller, is the gain for the integral part of the controller 205, which is proportional to the integral of the error "e" over previous sampling intervals, which may include all previous sampling intervals. Integral control may be used to provide an acceptably damped response and to drive the error "e" eventually tending to zero.

Regarding the self-tuning portion of the control system 200, the model estimator 201 and the controller designer 202 provide adaptive control as follows. In an example, the model estimator 201 receives the control variable "u(k)" and an average value "y" for each of one or more performance metrics. Based on these inputs, the model estimator 201 determines a set of adjustable model parameters, "a" and "b," that are output to the controller designer 202. The model estimator 201 observes the control variable u(k) and the performance metric y(k) over time and uses this information to calculate the adjustable model parameters "a" and "b". The controller designer 202 uses the newly calculated model parameters "a" and "b" to calculate the controller parameters (Kp, Ki). The new values for u(k), y(k), a, b, Kp, Ki, and e(k) may be obtained for each sampling interval, k.

The model estimator 201 uses a dynamic model of a controlled system to represent the relation between the control variable u(k) and the performance metric y(k) and to estimate the model parameters repeatedly at each sampling interval. In an example, the model estimator 201 uses a dynamic model comprising a first-order or higher-order, auto-regressive model to represent the relation between u(k) and y(k) and to estimate the model parameters "a" and "b" at each sampling interval. According to an embodiment, a first-order, auto-regressive model used by the model estimator 201 may be expressed as:

$$y(k+1)=b_0u(k)+a_1y(k) \quad \text{Eq. (3)}$$

where y is the performance metric measured for an interval "k", u is the control variable for the interval "k", and $b_0$ and $a_1$ are estimated coefficients representing adjustable model parameters. The model estimator 201 may then determine the values of "$a_1$" and "$b_0$" to provide an open loop transfer function according to the z-transform of Eq. (4), G(z), from u(k) to y(k) as follows:

$$G(z)=\frac{Y(z)}{U(z)}=\frac{b_0}{z-a_1} \quad \text{Eq. (4)}$$

The model estimator 201 may determine the values of "$a_1$" and "$b_0$" using a recursive least squares algorithm (RLS), as is known in the art. Also, the z-transform shown in Eq. (4) is a way of expressing Eq. (3) in the form of a transfer function, which may be useful for the controller designer 202 to determine Kp and Ki.

Methods for obtaining first-order, auto-regressive models that may be used for the model estimator 201 include a least-squares algorithm or a recursive least-squares algorithm as is known in the art. Thus, the model estimator 201 may observe the control variable u(k) and the performance metrics y(k) over time and use this information to determine the adjustable model parameters $a_1$ and $b_0$ at every sampling interval. Values for u(k), y(k), $a_1$, $b_0$, Kp, Ki, and e(k) may be obtained for each sampling interval, k.

As described above, the controller designer 202 is operable to calculate a new set of controller parameters (Kp, Ki) based on the revised adjustable model parameters "a" and "b" output by the model estimator 201. In an example, the controller designer 202 determines, for the control system 200, the desired closed-loop system poles based on design criteria such as, but not limited to, stability, rise time, settling time, and bound on overshoot. The controller designer 202 may then determine the value for Kp and Ki based on these desired closed-loop system poles and the model parameter values a and b, using a pole-placement algorithm as described in more details below.

The controller algorithm in Eq. (2) can be represented equivalently in the following recursive form:

$$u(k)=u(k-1)+(Kp+Ki)*e(k)-Kp*e(k-1) \quad \text{Eq. (5)}$$

The transfer function of the controller 205 according to the z-transform of Eq. (5) is as follows:

$$K(z) = \frac{Y(z)}{U(z)} = K_{pi}\frac{z - K_p/K_{pi}}{z-1} \quad \text{Eq. (6)}$$

where Kpi=Kp+Ki.

Combining Eq. (5) and Eq. (6), the transfer function of the closed-loop system follows:

$$C(z) = \frac{G(z)K(z)}{1+G(z)K(z)} = \frac{b_0 K_{pi}(z-K_p/K_{pi})}{z^2 - (a_1+1-b_0 K_{pi})z + (a_1 - b_0 K_p)} \quad \text{Eq. (7)}$$

Let p1 and p2 be the desired closed-loop system poles determined by the controller designer 202 based on design criteria. Then, the controller designer 202 calculates the controller parameters (Kp, Ki) by solving the following linear equations:

$$a_1+1-b_0 K_{pi}=p_1+p_2$$

$$a_1-b_0 K_p=p_1 p_2 \quad \text{Eq. (8)}$$

As a result, the controller parameters (Kp, Ki) can be computed using the following formula:

$$K_p = \frac{a_1 - p_1 p_2}{b_0} \quad \text{Eq. (9)}$$

$$K_i = \frac{(1-p_1)(1-p_2)}{b_0}$$

The controller designer 202 may output the adjusted Kp and Ki values to the controller 205 for determination of the control variable u(k) at every sampling interval in accordance with Equation 2, for example.

The control system 200 controls resource allocation using adaptive feedback control. In particular, using the self-tuning regulator portion of the control system 200, the control system 200 adjusts resource allocation to meet the required service level specified by the SLA input(s) 105 based on changes in demand, such as application workload, over time using adaptive feedback control. As demand changes, the system 200 adjusts the controller parameters Kp and Ki based on an estimated model of the dynamic system behavior. The control system 200 adjusts the controller parameters Kp and Ki as required to ensure that service levels continue to be met efficiently and reliably using resource allocations that track resource demand.

Figure 4:
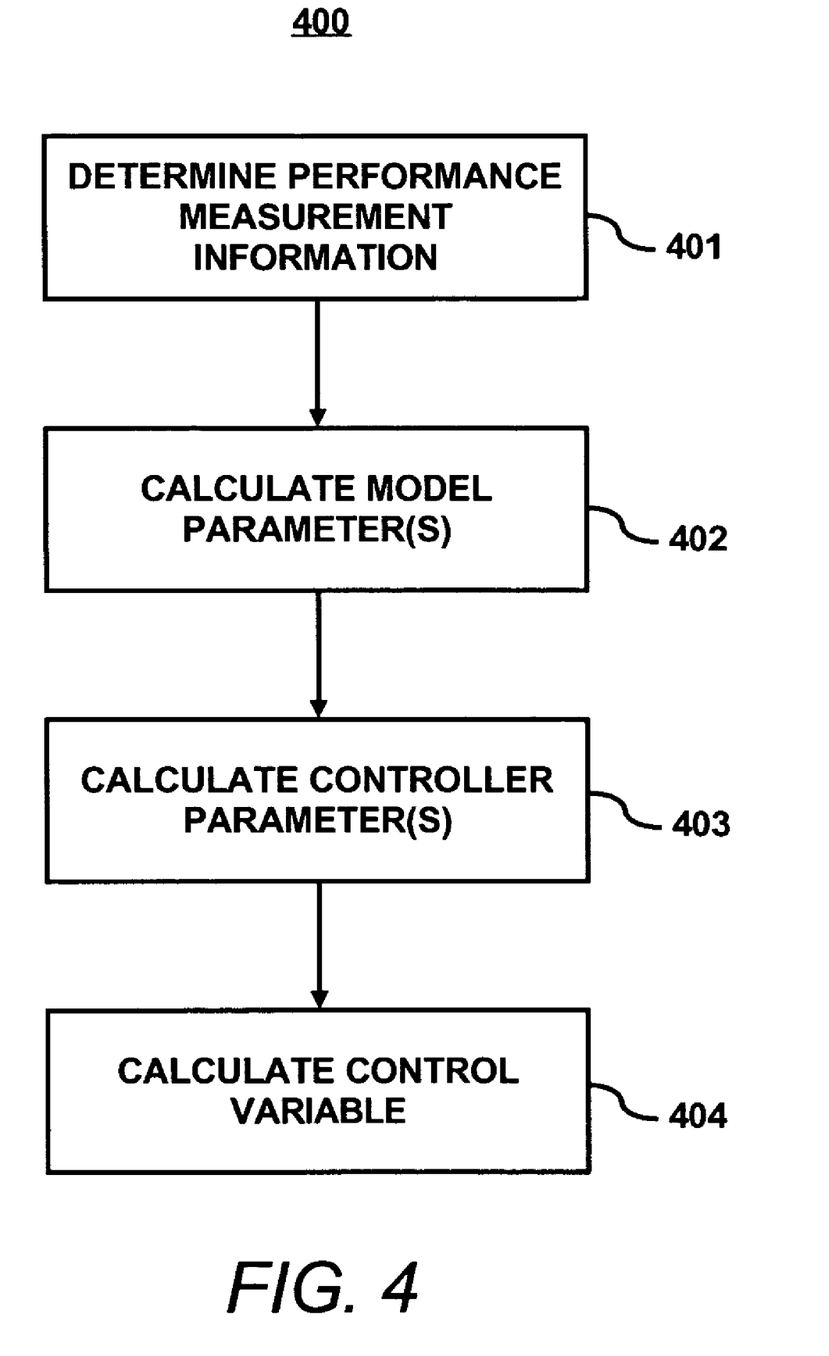
FIG. 4 is a flowchart of a method, according to an embodiment.

With reference to FIG. 4, there is shown a method 400, according to an embodiment. The method 400 adjusts resource allocation based on changes in demand over time using an adaptive feedback control loop, such as provided in the control system 200 shown in FIG. 3. The method 400 is described with respect to FIGS. 1-3 by way of example and not limitation.

Referring to FIG. 4, at step 401, the performance monitor 107 determines performance measurement information for the resource container 103a. The performance measurement information may include performance metrics. For example, the performance monitor 107 may calculate an average or a moving average based on a measured metric for one or more sampling intervals. The performance metric varies over time, such as described above with respect to the performance metric "y(k)".

At step 402, the model estimator 201 calculates model parameters. The model parameters may be calculated using a history of the control variable calculated by the controller 205 and the performance metric determined by the performance monitor 107. For example, the model estimator 201 receives the control variable u(k) and the performance metric y(k) calculated over time as input. A set of adjustable model parameters, "a" and "b," are calculated by the model estimator 201 using a model, such as a first-order, auto-regressive model.

At step 403, the controller designer 202 calculates one or more controller parameters for the controller 205. For example, using a proportional and integral controller for the controller 205, two controller parameters "Kp" and Ki" are calculated by the controller designer 202. Using a proportional controller for the controller 205, a controller parameter "Kp" is calculated by the controller designer 202. The controller parameters are calculated using the model parameters determined by the model estimator 201.

At step 404, the controller 205 calculates a control variable for controlling the allocation of resources to the resource container 103a. For example, the control variable "u(k)" is calculated in accordance with Equation 2 based on the controller parameters calculated by the controller designer 202 and the measured performance metrics. In one example, the error signal "e(k)" is determined from the reference signal "r" and the performance metric "y(k)". The error signal "e(k)" is used by the controller 205 to calculate the control variable "u(k)". The control variable "u(k)" may be sent to control the allocation of resources to the resource container 103a. For example, "u(k)" may be a variable representing a percentage of CPU entitlement for the resource container 103a. The resource allocator 106 shown in FIG. 1 sends the determined percentage of CPU entitlement to the resource scheduler 110a, and the resource scheduler 110a allocates resources to the resource container 103a accordingly, and at the same time adjusts the percentage of CPU entitlement for other resource containers on the server.

The steps of the method 400 may be performed for each sampling interval of a plurality of sampling intervals. For example, the performance metric y(k) may be a moving average of the last five sampling intervals k−5 . . . k−1. The performance metric y(k) is continually determined for each new sampling interval based on the last five sampling intervals. The control variable "u(k)" may then be continually adjusted over time based on the varying performance metric. Thus, the resource allocation for the container 103a may be periodically adjusted. Furthermore, the steps of the method 400 may be performed for several resource containers in order to provide the most efficient allocation of resources across one or more or servers servicing multiple applications with varying demand.

Figure 5:
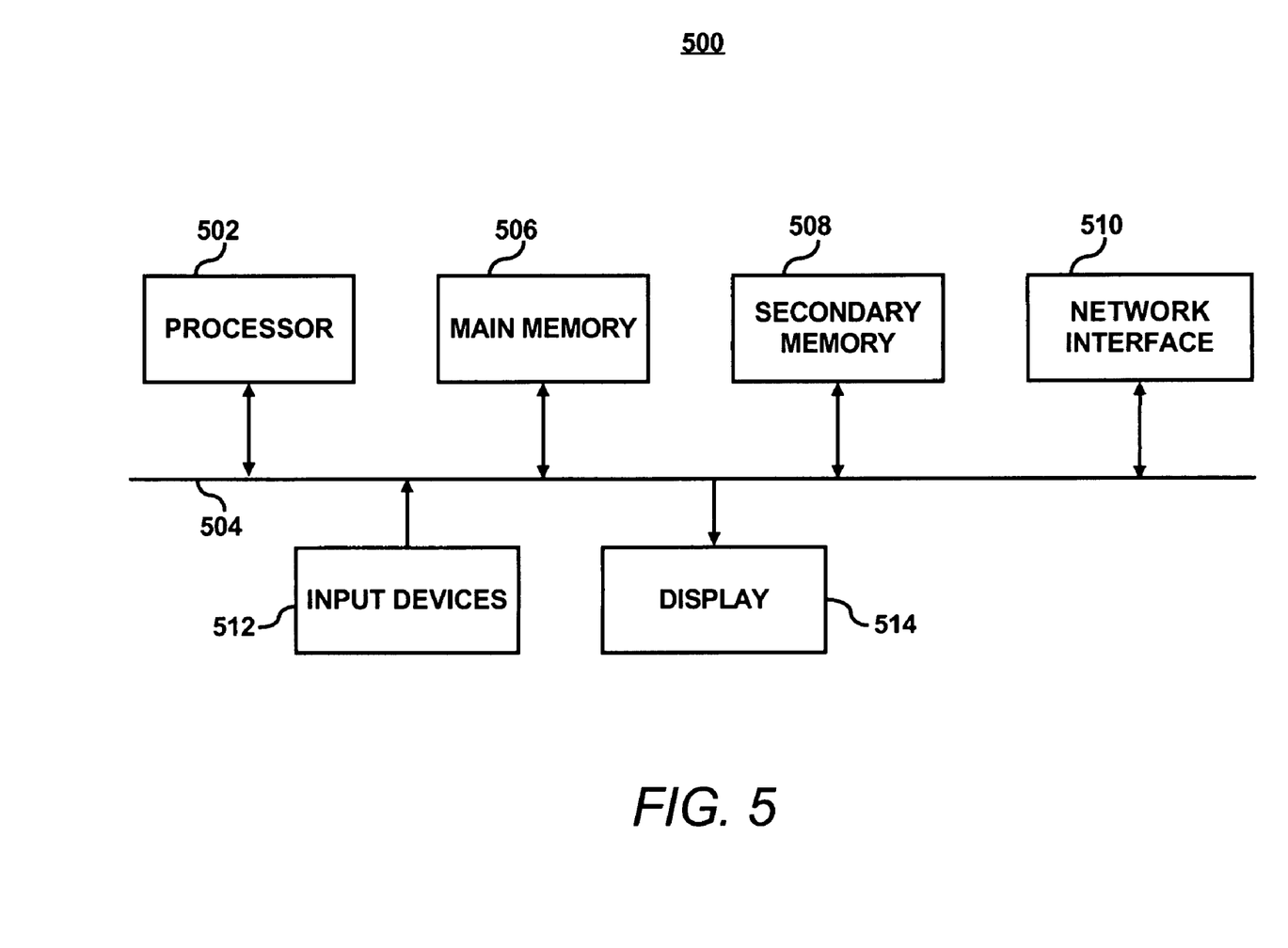
FIG. 5 is a block diagram of a computer system, according to an embodiment.

FIG. 5 illustrates an example of a hardware platform for the resource allocator 106 or other devices in the system 100 shown in FIG. 1. For example, the hardware platform includes a computer system 500. The computer system 500 includes one or more processors, such as processor 502, providing an execution platform for executing software. Commands and data from the processor 502 are communicated over a communication bus 504. The computer system 500 also includes a main memory 506, such as a Random Access Memory (RAM), where software may be resident during runtime, and a secondary memory 508. The secondary memory 508 includes, for example, a hard disk drive or other type of storage device. Other examples of the secondary memory 508 include ROM (read only memory), EPROM (erasable, programmable ROM), EEPROM (electrically erasable, programmable ROM).

The computer system 500 optionally includes user interfaces comprising one or more input devices 512, such as a keyboard, a mouse, a stylus, and the like. The computer system 500 also optionally includes a display 514. A network interface 510 is provided for communicating with other computer systems. It will be apparent to one of ordinary skill in the art that the computer system 500 may include more or less features depending on the complexity of the system needed.

According to an embodiment, one or more of the steps of the method 400 is implemented as software embedded on a computer readable medium, such as the memory 506 and/or 508, and executed on the computer system 500, for example, by the processor 502.

In an example, the control system 200 may be implemented using a set of programmed instructions that when executed by a processor causes the processor 502 to perform as described herein, including the steps described with respect to FIG. 4. The instructions may be a set of executable instructions derived from one or more source code modules implemented using any number of known programming languages such as, for example, Perl, C or Visual Basic. Alternatively, the instructions may be implemented using hardware or firmware, or a combination thereof or in further combination with the executable software instructions described above. The instructions may be embodied upon a computer-readable medium and downloaded to the system 200 or retrieved by the system 200 into one or more local memories for execution.

In an example, the feedback node 203 may be implemented using a set of programmed instructions that perform Eq. (1). Alternatively, the feedback node 203 may be constructed as a differential amplifier using an operational amplifier and related components as is known in the art.

One or more of the steps of the method 400 are embodied in a computer program, which may exist in a variety of forms both active and inactive. For example, the steps exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A resource entitlement control system, comprising:
a controller operable to control an allocation of resources to a resource container;
a performance monitor operable to measure at least one performance metric of an application in the resource container and provide at least one measured performance metric;
a model estimator operable to calculate model parameters based on the at least one measured performance metric and a control variable from the controller using a first-order auto-regressive model:

$$y(k+1)=b_0 u(k)+a_1 y(k),$$

wherein y is the at least one measured performance metric from the performance monitor for an interval k, u is the control variable from the controller for the interval k, and $a_1$ and $b_0$ are estimated coefficients representing the model parameters of the model estimator;

a feedback node configured to compare the at least one measured performance metric from the performance monitor to a reference value to produce an error output; and a controller designer operable to calculate at least one controller parameter based on the model parameters from the model estimator, wherein the controller is operable to calculate the control variable for controlling the allocation of resources to the resource container in response to the at least one controller parameter and the error output.

2. The resource entitlement control system of claim 1, wherein the at least one performance metric is a mean response time for the application in the resource container to service requests.

3. The resource entitlement control system of claim 1, wherein the reference value is a performance parameter or a value calculated from the performance parameter, wherein the controller is operable to control the allocation of resources to the resource container to satisfy the performance parameter.

4. The resource entitlement control system of claim 3, wherein the performance parameter is identified from a service level agreement.

5. The resource entitlement control system of claim 1, wherein the model estimator comprises a recursive least-squares algorithm for determining the model parameters.

6. The resource entitlement control system of claim 1, wherein the controller comprises at least one of a proportional controller and a proportional integral controller.

7. The resource entitlement control system of claim 6, wherein the controller designer is operable to output at least one adjusted controller parameter used by the controller to determine the control variable.

8. The resource entitlement control system of claim 7, wherein the at least one adjusted controller parameter comprises "Kp" and "Ki".

9. The resource entitlement control system of claim 1, wherein the performance monitor is operable to measure the at least one performance metric for sampling intervals as the at least one performance metric varies over time.

10. The resource entitlement control system of claim 9, wherein the control variable is calculated for the sampling intervals.

11. A method of allocating resources, comprising:
   determining at least one performance metric for an application in a resource container;
   calculating model parameters;
   calculating at least one controller parameter using the model parameters;
   producing an error output by comparing the at least one performance metric to a reference value and producing a difference between the at least one performance metric and the reference value as the error output; and
   calculating a control variable in response to the at least one controller parameter and the error output, wherein the control variable is used to control the allocation of resources to the resource container; and
   wherein the model parameters are calculated based on the at least one measured performance metric and a control variable using a first-order auto-regressive model:

$$y(k+1)=b_0 u(k)+a_1 y(k),$$

wherein y is the at least one measured performance metric for an interval k, u is a control variable for the interval k, and $a_1$ and $b_0$ are estimated coefficients representing the model parameters.

12. The method of claim 11, wherein the at least one performance metric is determined based on the at least one performance metric measured during a sampling interval of a plurality of sampling intervals.

13. The method of claim 12, wherein the control variable is calculated for each sampling interval.

14. The method of claim 13, wherein the model parameters and the at least one controller parameter are calculated for each sampling interval.

15. The method of claim 11, wherein calculating a control variable further comprises:
   using at least one of a proportional controller and a proportional integral controller to calculate the control variable.

16. The method of claim 11, wherein calculating model parameters further comprises:
   using a recursive least-squares algorithm for estimating the model parameters.

17. A tangible computer readable data storage medium upon which is embedded a sequence of programmed instructions which when executed by a processor will cause the processor to perform the following steps comprising:
   determining at least one performance metric for an application in a resource container;
   calculating model parameters using a model of a controlled system and a recursive algorithm;
   calculating at least one controller parameter for a controller using the model parameters;
   producing an error output by comparing the at least one performance metric to a reference value and producing a difference between the at least one performance metric and the reference value as the error output; and
   calculating a control variable in response to the at least one controller parameter and the error output, wherein the control variable is used to control the allocation of resources to the resource container,
   wherein the model of a controlled system and a recursive algorithm for calculating the model parameters includes a first-order auto-regressive model:

$$y(k+1)=b_0 u(k)+a_1 y(k),$$

wherein y is the at least one measured performance metric for an interval k, u is a control variable for the interval k, and $a_1$ and $b_0$ are estimated coefficients representing the model parameters.

18. The tangible computer readable data storage medium of claim 17, wherein determining at least one performance metric further comprises determining a performance metric varying over time.

19. An apparatus comprising:
   a controller means for controlling an allocation of resources to a resource container;
   a performance monitor means for measuring at least one performance metric of an application in the resource container and providing at least one measured performance metric;
   a model estimator means for calculating model parameters based on a first-order auto-regressive model:

$$y(k+1)=b_0 u(k)+a_1 y(k),$$

wherein y is the at least one measured performance metric from the performance monitor means for an interval k, u is a control variable from the controller means for the interval k, and $a_1$ and $b_0$ are estimated coefficients representing the model parameters of the model estimator means;
   a feedback node configured to compare the at least one measured performance metric to a reference value in producing an error output; and
   a controller designer means for calculating at least one controller parameter based on the model parameters, wherein the controller means is operable to calculate the control variable for controlling the allocation of resources in response to the at least one controller parameter and the error output.

* * * * *